United States Patent Office 3,437,215
Patented Apr. 8, 1969

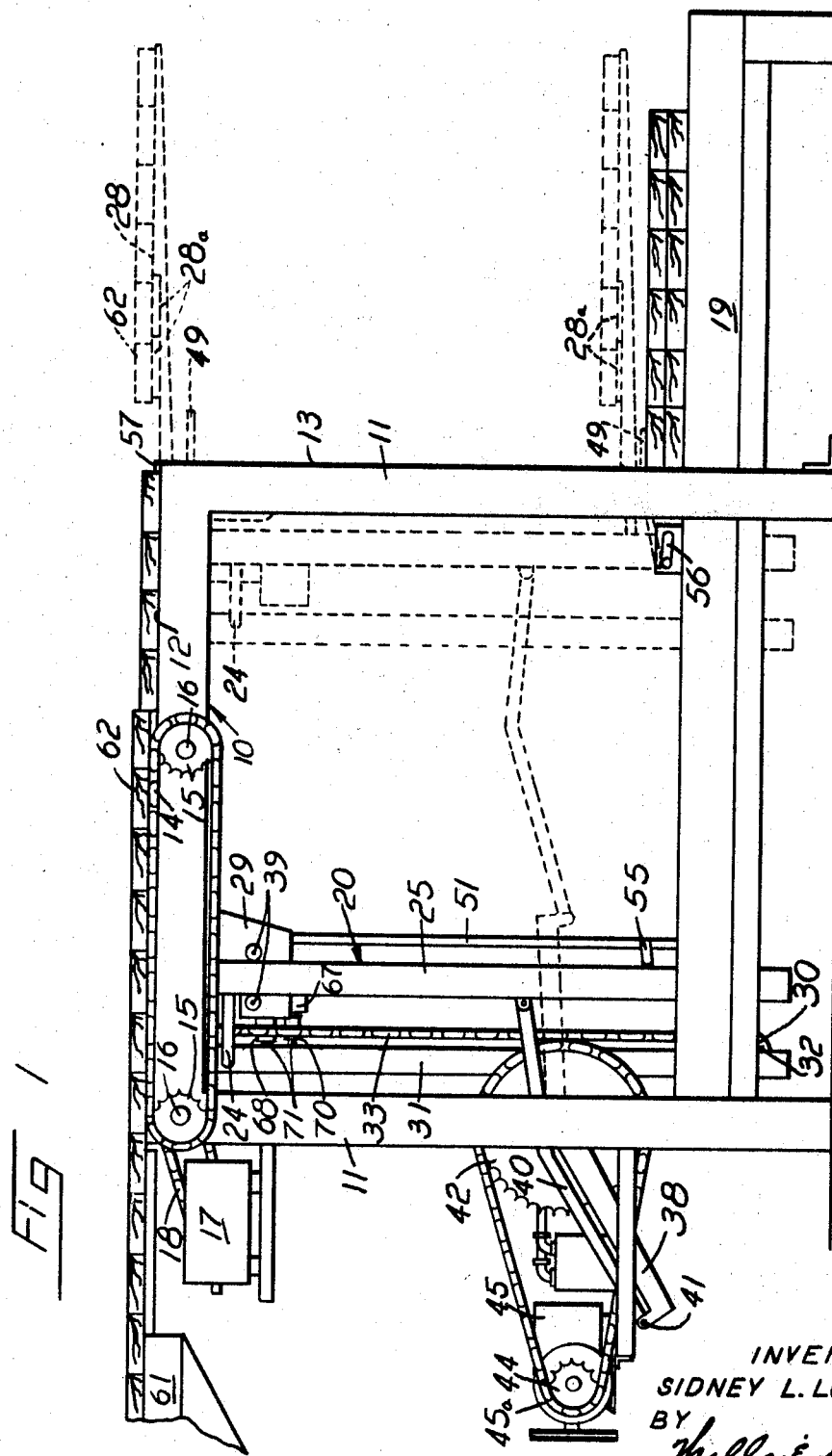

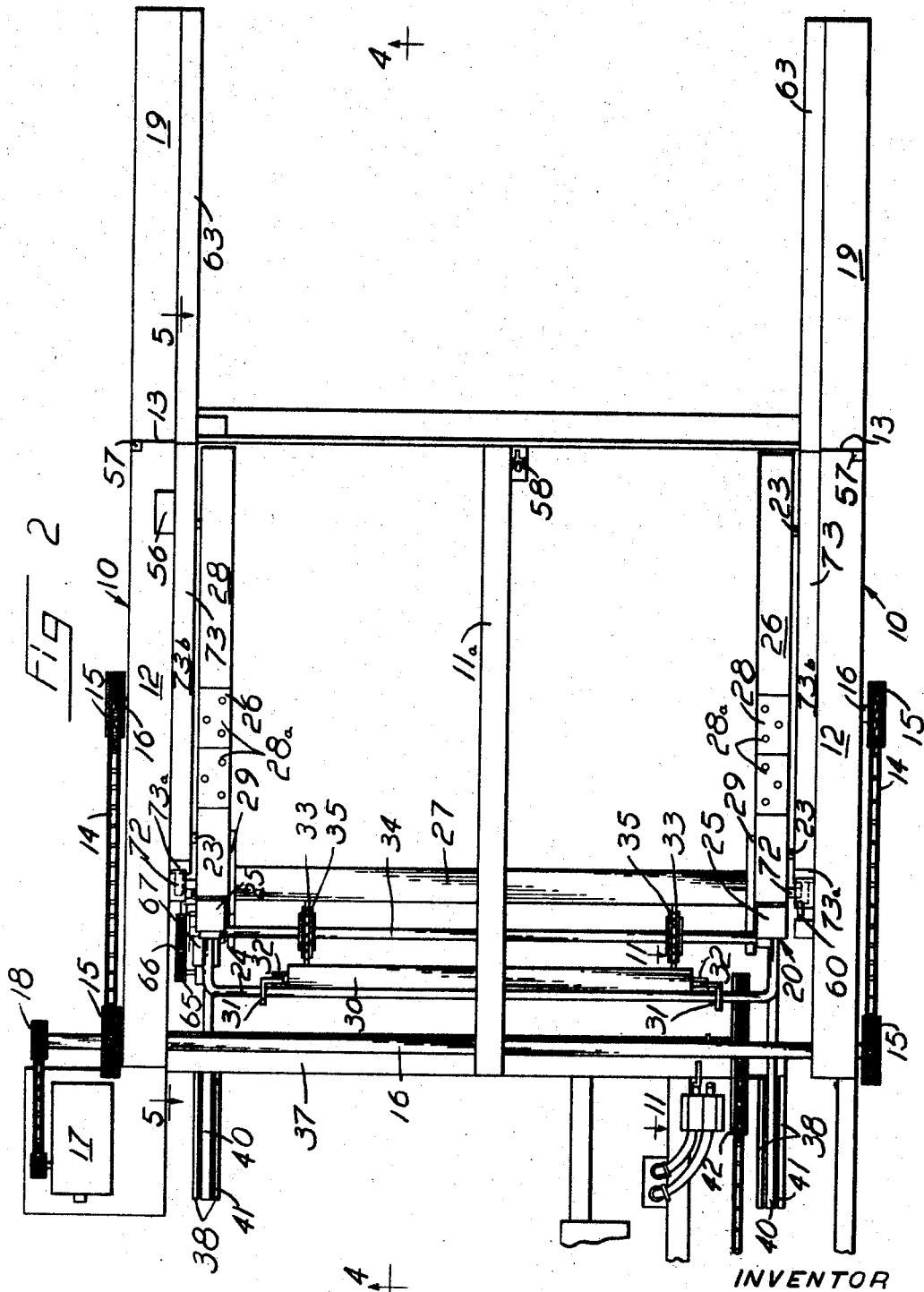

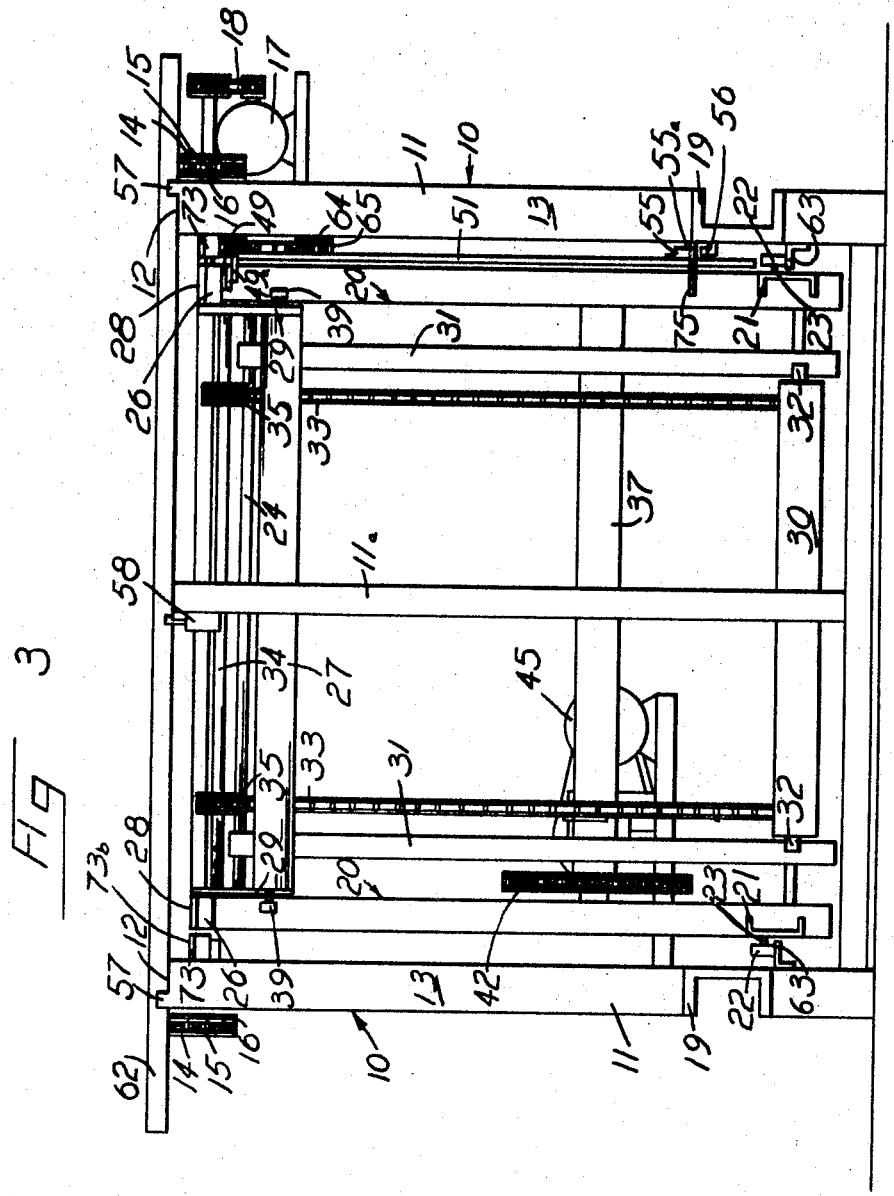

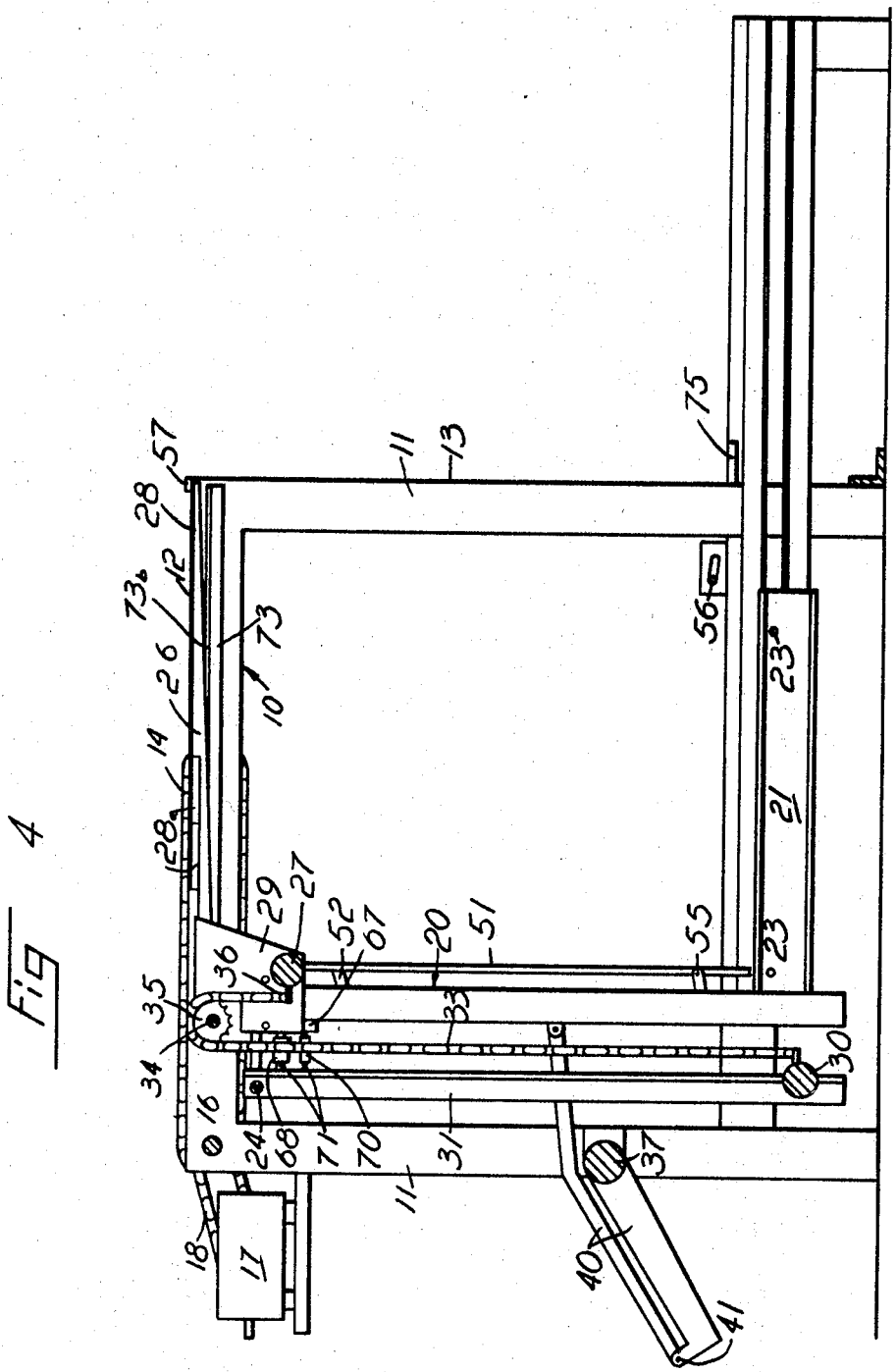

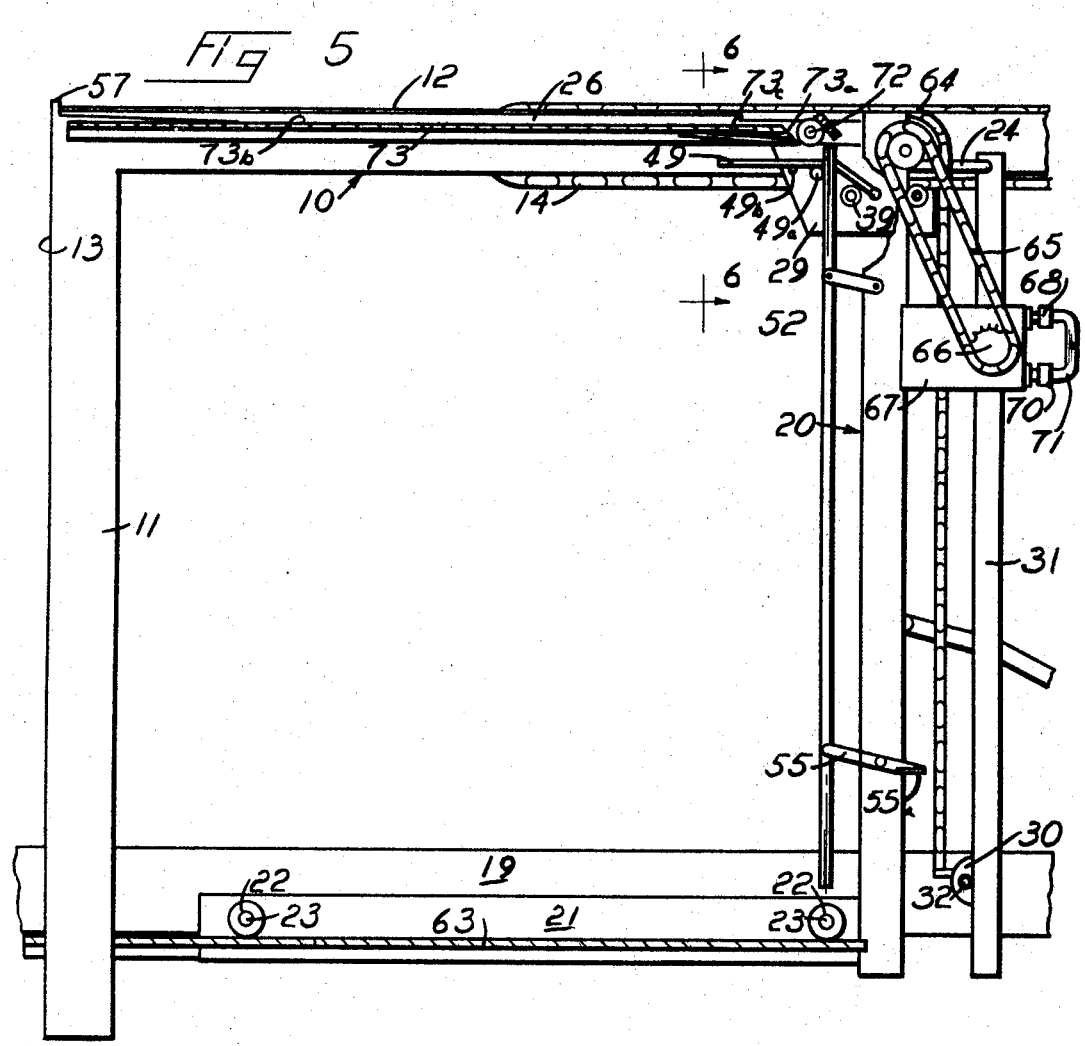
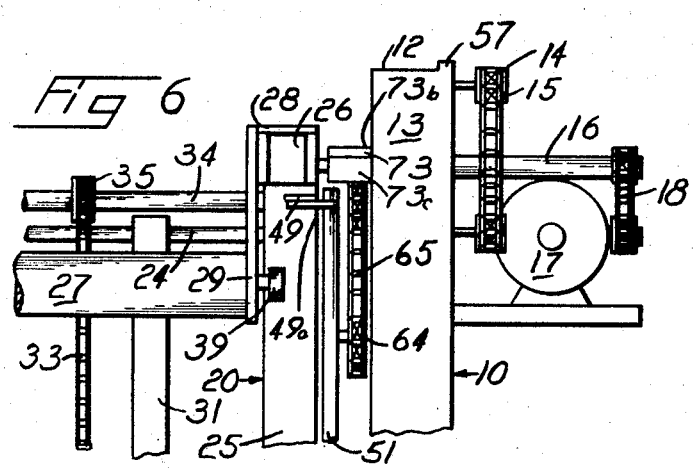

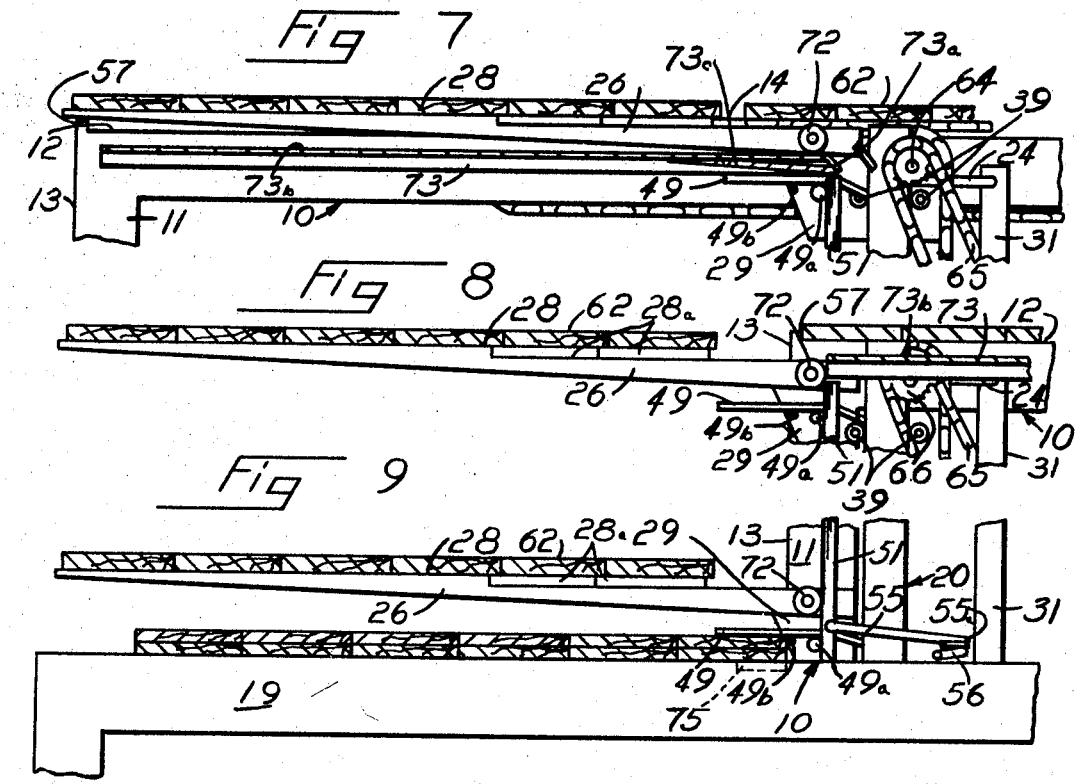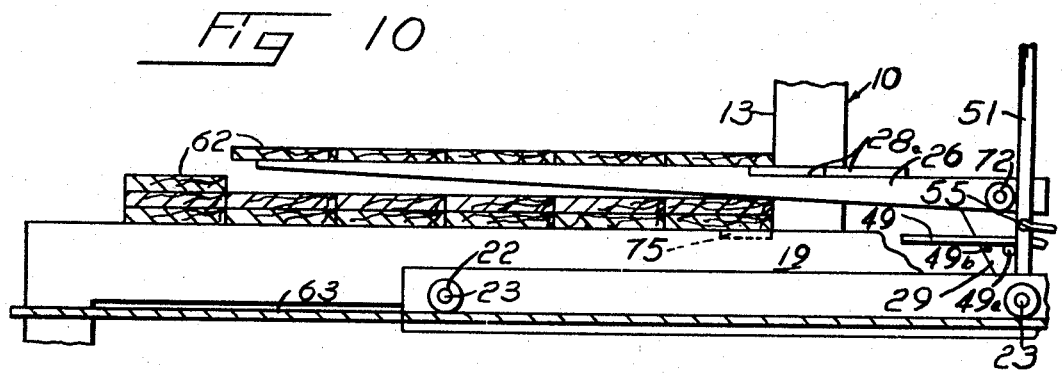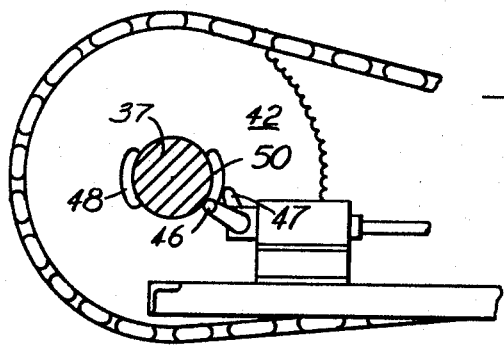

3,437,215
LUMBER STACKER
Sidney L. Lunden, Spokane, Wash., assignor, by mesne assignments, to Moore-IEM, Inc., Spokane, Wash., a corporation of Washington
Filed Jan. 5, 1966, Ser. No. 518,965
Int. Cl. B65g 57/03
U.S. Cl. 214—6                                    10 Claims

ABSTRACT OF THE DISCLOSURE

A lumber stacking apparatus has a framework 10 with lumber support surface 12 and upright members 11. A carriage 20 is reciprocally mounted on the framework 10 for forward and back movement. Vertically movable lumber support arms 26 are mounted on the carriage 20 for up and down movement. A counterweight 30 is connected to the arms 26 for biasing the arms 26 upward when lumber is removed from the arms. As the carriage 20 moves forward the arms 26 are elevated above the surface 11 to engage the forwardmost boards to define a layer and to move the boards forward of the uprights 12. When the counterweight 30 then permits the arms to move downwardly until a feeler device 49 senses the top of the stack and activates a motor to move the carriage 20 back to pull the arms from beneath the layer to drop the boards onto the stack. When the boards are removed from the arms 26, counterweight 30 raises the arms into position for a succeeding cycle.

---

This invention relates to a device for stacking lumber, being designed to mechanically produce a stack of boards in successive parallel layers for handling, storage, or shipping purposes.

The present invention generally provides a mechanically simple stacker for vertically placing successive layers of abutting boards one upon the other in a continuous cycle. The machine is totally automatic, requiring only the removal of completed stacks of lumber from the machine at spaced intervals.

It is a first object of this invention to provide a simple machine for stacking lumber in a vertically straight stack with little expenditure of power and at a rate sufficient to handle the output requirements of a conventional sawmill.

Another object of this invention is to provide a machine that stacks lumber from an upper conveyor downwardly to a stack, rather than to lift the boards from a conveyor as previously was done.

Another object of this invention is to provide a reasonably safe machine wherein the handling of the boards is basically effected by the weight of the boards themselves so that the danger of a mechanically powered device injuring nearby workers is minimized.

Another object of this invention is to provide a stacker which can be easily adapted to a movable platform, the stacking device being able to leave partially formed stacks at any time and to return to them later for completion.

These and further objects will be evident from the following disclosure, taken together with the accompanying drawings. The drawings illustrate a preferred form of the invention. It is to be understood that this form of the invention is presented only by way of example and is not intended to limit the scope of the invention.

In the drawings:

FIGURE 1 is a side elevation view of the machine showing the handling of incoming boards, successive position of the board handling apparatus being shown in dashed lines;

FIGURE 2 is a top view of the basic machine in FIGURE 1 with the mechanism shown in its initial starting position;

FIGURE 3 is a front view of the apparatus as seen in FIGURE 2;

FIGURE 4 is a longitudinal sectional view taken along line 4—4 in FIGURE 2;

FIGURE 5 is a fragmentary sectional view taken along line 5—5 in FIGURE 3 at a slightly increased scale;

FIGURE 6 is a fragmentary sectional view taken along line 6—6 in FIGURE 5 at an increased scale;

FIGURES 7 through 10 are fragmentary views illustrating the operation of the apparatus;

FIGURE 7 is a fragmentary view taken generally along line 5—5 in FIGURE 3 showing the board supporting arms after initial lifting motion;

FIGURE 8 is a view similar to FIGURE 7 showing the board supporting arms following their release at the front of the guiding cam surface;

FIGURE 9 is a view similar to FIGURE 7 showing the board supporting arms as contact is made with the stacked boards by the control apparatus;

FIGURE 10 is a view similar to FIGURE 7 showing retraction of the arms and placement of the boards on the stack; and FIGURE 11 is a fragmentary view taken along line 11—11 in FIGURE 2 at an increased scale.

The general apparatus used in the stacking of lumber is illustrated in FIGURES 1 through 4. FIGURES 5 and 7 through 10 show the most critical operational positions of the stacking components. The apparatus will be described herein with relation to the movement of boards stacked by it. Specifically, the portion of the machine shown to the left in FIGURE 1 shall be termed the rear of the machine and that shown to the right in FIGURE 1 shall be termed the front, corresponding to the forward movement of boards across the top of the machine toward the partially completed stack shown to the right of the apparatus.

The apparatus comprises a supporting framework shown in a fixed position, although it could be movably mounted as will be discussed below. The framework is designated generally by the numeral 10. It includes two upright side members 11 having substantial strength. The members 11 are not connected along their upper and front portions which are entirely open between the upright members 11. Each member 11 is provided with a plane upwardly facing top surface 12 and a plane upright front surface 13. The surfaces 12 and 13 respectively of the two members 11 are coplanar.

Lumber is supplied to the apparatus by an external conveyor 61 (FIGURE 1) having a conventional conveyor structure. Boards 62 are fed by conveyor 61 in transverse positions adjacent to one another. The boards are transferred to chains 14 on framework 10, located at the outside of each member 11. Chains 14 are supported by sprockets 15 on shafts 16 at the two sides of framework 10, the rear shaft 16 being extended across the machine and operatively connecting the two chains 14 (FIGURE 2). Chains 14 are powered by a motor 17 and connecting drive chain 18 and are constantly turned in a direction such that the upper flights of chains 14 move in a horizontal forward direction.

At the front of each top surface 12 on the members 11 is an upwardly protruding stop or abutment 57. Each abutment or stop is designed to prevent forward movement of boards 62 beyond the termination of surfaces 12. The elevation of the upper supporting surfaces on chains 14 is slightly above that of the adjacent surfaces 12, whereby boards 62 on chains 14 pass freely over the upper surfaces 12 while supported on chains 14. However, chains 14 terminate substantially short of the stops 57, so that successive boards 62 must be pushed by one another in directly abutting positions until the front board being pushed comes into contact with stops 57 in the manner shown in FIGURE 1.

The relative distance between the forward end of chains 14 and stops 57 is such that the boards positioned on surfaces 12 forward of chains 14, as well as an equal number of boards on chains 14, will usually be in direct abutment to provide a solid layer of boards at the forward portion of the machine, the front board surface being in contact with stops 57. The frictional engagement of the boards and surfaces 12 insures the provision of a layer of abutting boards at the front of the machine.

Mounted within framework 10 is a movable frame or carriage 20. Frame 20 is supported for longitudinal translational movement in a forward or rearward direction relative to framework 10. Frame 20 includes two supporting horizontal channels 21 (FIGURE 3). Channels 21 are individually carried by front and rear rollers 22 rotatably mounted by roller shafts 23 (FIGURE 4). Rollers 22 ride along inwardly directed ledges 63 on framework 10 and support frame 20 for horizontal movement. The ledges 63 extend along the full length of longitudinal channels 19 provided on the framework 10. Both channels 19 and ledges 63 protrude forwardly beyond the front surfaces 13 of the respective side members 11 (FIGURE 1).

Frame 20 also includes two upright posts 25 fixed respectively to the rear ends of the channels 21. Posts 25 extend upwardly from channels 21 to the top of the machine. They are rigidly joined to one another at their upper ends by a horizontal U-shaped cross member 24 (FIGURE 2) which extends rearwardly a short distance from the respective posts 25.

Frame 20 is moved relative to framework 10 by means of a drive shaft 37 rotatably supported by the side members 11 at the rear of the machine (FIGURES 2, 4). Shaft 37 has a driven sprocket 42 fixed thereto (FIGURE 11). It also has two identical cranks 38 fixed to it in longitudinal alignment with the two posts 25. The outer end of each crank 38 is pivotally connected to the rear end of an arm 40 about a transverse movable rotational axis. The forward ends of the longitudinally bent arms 40 are pivoted at 41 to the respective posts with which they are longitudinally aligned. Thus rotational motion of shaft 37 for 180 degrees about its transverse axis on framework 10 will cause shaft 37 to shift frame 20 between the rear position shown in full lines in FIGURE 1 and the forwardly extended position shown in dashed lines.

Sprocket 42 is powered by a driving sprocket 44 and interconnecting chain 43. A suitable motor and brake unit 45 and transmission 45a on framework 10 are used to turn sprocket 44. A starter 51 is on framework 10. The limited rotational movement of sprocket 44 and shaft 37 is controlled by two cams 48, 50 and two switches 46, 47 respectively operated by the cams 48, 50. The angular positions of cams 48, 50 on shaft 37 (FIGURE 11) is such that the respective switches 46, 47 will be actuated to open the motor circuit and allow the spring biased brake to stop rotation of motor and brake 45 at the completion of the desired angular movement of shaft 37. The direction of rotation of shaft 37 will subsequently be reversed upon operation of motor 45.

Boards 62 are physically lifted from their supporting surfaces 12 on framework 10 by means of vertically movable support arms 26 on frame 20. The two support arms 26 are located inwardly adjacent to the side members 11 (FIGURE 2). The forward portion of each support arm 26 is formed with a slightly raised upwardly facing top surface 28 having no other portion of the support arms 26 at an elevation above it. The longitudinal dimension of the top surface 28 approximates the combined width of boards 62 to be carried thereby.

Arms 26 are rigidly secured to one another by means of downwardly protruding plates 29 fixed at the inner side of each arm 26 and a rigid connecting shaft 27 that extends between them. The arms 26 are guided as a unit for vertical motion relative to posts 25 on frame 20 by means of front and rear rollers 39 carried on the respective plates 29.

A counterweight 30, extending transversely across the width of frame 20, is provided to balance the weight of arms 26. Counterweight 30 is guided for vertical movement on frame 20 by upright guides 31 which extend downwardly from the previously described cross member 24. Brackets 32 at each of the ends of counterweight 30 slidably contact the upright surfaces of guides 31 (FIGURE 5). The counterweight 30 is carried by two transversely spaced chains 33. Chains 33 pass over sprockets 35 on a freely rotatable shaft 34 journalled at the upper ends of posts 25. One end of each chain 33 is connected to the counterweight 30 and the remaining end is connected to a suitable anchor 36 on the rigid connecting shaft 27 between the arms 26 (FIGURE 4).

At the right side of the machine (FIGURE 3) is a control rod 51 positioned vertically adjacent to post 25. Rod 51 is supported by an upper support arm 52 and a lower operating lever 55. Arm 52 and lever 55 are parallel to one another and pivotally connected to both posts 25 and rod 51 about vertically aligned axes. Rod 51 is thereby maintained in a vertical position parallel to post 25.

Extending outwardly from plate 29 on the support arm 26 at the right side of the machine (FIGURES 5 and 6) is a control lever 49 pivoted at its rear end about an axis vertically aligned with the pivotal axes of arm 52 and lever 55 on posts 25. The control lever 49 protrudes forwardly beyond rod 51 and is inwardly adjacent thereto. At its underside it has fixed to it an outwardly protruding transverse rod 49a which abuts the forward surface of rod 51. An outwardly protruding fixed stop 49b on the adjacent plate 29 limits counterclockwise movement of lever 49 as seen in FIGURE 5. Lever 49, acting through rod 49a, at all times maintains rod 51 in a position relative to post 25 such that the pivotal axes of arm 52 and lever 55 on rod 51 are elevated slightly above their respective axes on post 25. Lever 55 extends rearwardly beyond its pivotal connection on post 25 and is provided with an outwardly protruding plate 55a at its rear end. Plate 55a assumes a substantially horizontal position.

Lever 55 is used, during operation of the machine, to selectively actuate a limit switch 56 on framework 10 when post 25 and frame 20 are at their forward extended positions. This relationship is shown in FIGURES 3 and 9, and is illustrated by the dashed line showing in FIGURE 1.

Shaft 34 which is rotated by elevational movement of support arms 26 and counterweight 30, extends beyond post 25 at the right side of the machine. The outer extension of shaft 34 has fixed to it a sprocket 64. This sprocket is engaged by a chain 65, entrained about another sprocket 66 connected to the shaft of a conventional reversible pump 67 on the adjacent post 25. The inlet and outlet connections for pump 67 are connected to one another through two valves 68, 70 interposed in the connecting hose 71. The pump 67 and valves 68, 70 regulate the rate of motion of support arms 26 and counterweight 30 in opposite vertical directions. Valve 68, which regulates upward travel of arms 26 relative to frame 20, is a flow control valve. The downward motion of arms 26 is regulated by valve 70, a pressure compensated flow control valve which insures the same rate of flow regardless of pressure.

The elevation of arms 26, when not loaded is as illustrated in FIGURE 5. However, to properly lift boards 62 from the top surface 12 of framework 10, slight additional upward movement of support arms is required. This is achieved by inwardly directed cam members 73 fixed to the inner surface of the respective side members 11 at elevations beneath their top surfaces 12. Each cam member 73 is in identical alignment on the respective members 11. Each includes a longitudinal upper surface 73b which is horizontal. At the rear of each cam member 73 is a downwardly and rearwardly protruding cam surface 73a directed at a relatively steep angle. A more gentle lower surface 73c leads rearwardly and downwardly from the lower portion of the horizontal section of cam 73 to the lower end of its rear surface 73a.

The cam members 73 are respectively engaged by outwardly protruding rollers 72 respectively carried at the rear ends of the two support arms 26. Rollers 72 ride along the rear portions 73a and horizontal portions 73b of the respective cam members 73 as illustrated in FIGURES 5 and 7. Their positions relative to the support arms 26 are such that when rollers 72 are at their initial starting position (FIGURE 5), the raised top surfaces 28 of support arms 26 are recessed at an elevation slightly beneath that of the top surfaces 12 on framework 10. However, when rollers 72 are positioned on the cam surfaces 73b, the top surfaces 28 are at an elevation above that of the top surfaces of the conveyor chains 14 and above the stops 57, so that boards supported thereby are no longer longitudinally moved by the constantly moving chains 14 and are no longer limited in movement by the fixed stops 57.

An inclined stop 30a (FIGURES 5, 7) is located on framework 10 above and parallel to cam surface 73a at each side of the machine. They limit upward movement of rollers 72 relative to the rearwardly positioned frame 20.

In addition to the previously described controls, there is provided a limit switch 58 at the top front of the machine, carried on an intermediate longitudinal frame member 11a. Member 11a has no direct connections to the upper front corners of the frame members 11. The operating lever for limit switch 58 protrudes slightly above the elevation of the top surfaces 12 of the framework members 11 and will be contacted by the forwardmost board 62 as it engages the stops 57. A second limit switch 60 is provided at the left side of the machine and is engaged by the adjacent roller 72 when the support arms 26 are in their initial raised positions illustrated in FIGURES 1 through 5. This switch can be seen in FIGURE 2.

*Operation*

The operation of the apparatus can best be understood from FIGURES 1, 5, and 7 through 10. Taking first FIGURE 1, the incoming boards 62 are delivered to the apparatus by the conveyor 61. These boards might be delivered with some spacing between adjacent boards. The apparatus can handle rough sawn boards or boards emerging from a planer. In either event, the boards are directed forwardly onto the constantly moving chains 14, which move each board in a forward direction across a portion of the framework 10. Each board is then deposited on the top surface 12 of the respective side members 11. As is evident, the first board 62 will come to rest on the top surface 12. It will be pushed forward by the next succeeding board, which will be in direct abutment with it. These two boards will then be pushed by the next board and so on until the front board contacts the fixed stop 57. The frictional resistance to movement of the front two or three boards 62 will prevent contact of the front board with the stop 57 until there also are at least several boards in abutment with one another and resting on chains 14. Succeeding boards will then merely rest on the chains 14, which will slip beneath them.

When the front board 62 contacts the operating lever of switch 58 on framework 10 and when the switch 60 on framework 10 is in contact with the adjacent roller 72, forward movement of frame 20 will occur due to rotation of shaft 37 under the power of motor 45. The movement imparted to frame 20 through cranks 38 and connecting arms 40 is sinusodial due to the conversion of the rotational movement of shaft 37 to translational motion of frame 20. This motion provides smooth acceleration and deceleration at the respective limits of movement of frame 20 relative to framework 10. It insures that board 62 will be lifted and moved by the arms 26 without disturbing their desired positions directly abutting one another.

When switches 58 and 60 are both actuated, motor 45 will begin initial movement of frame 20 in a forward direction from the position assumed by frame 20 as a normal or first position (FIGURES 1 and 5). At this position, rollers 72 rest against the lower surfaces of stops 30a and are directly adjacent to the lower edge of the downwardly extending rear portion 73a of the respective cam members 73. The initial forward movement of frame 20 will cause rollers 72 to ride upwardly along surfaces 73a until they rest on the upper horizontal surface 73b of the cam members 73. This will result in the top surfaces 28 of support arms 26 being elevated above the top surfaces of chains 14 and above the upper surface 12 and stop 57 of each side member on framework 10. This initial elevated position is illustrated in FIGURE 7.

Upon attaining the elevation provided by contact of rollers 72 on surfaces 73b, the top surfaces 28 of the support arms 26 will lift the layer of boards 62 to be placed thereby. Since the remaining sections of arms 26 are recessed below the upper surfaces 28, the rearwardly adjacent boards will not be disturbed or lifted by support arms 26. The raised nature of the surfaces 28 insures that the same width of boards 62 will be lifted each time arms 26 are raised on the cam members 73.

Continued forward movement of the frame 20 will carry the boards 62 on top surfaces 28 of the support arms forwardly over the fixed stops 57 and beyond the front surfaces 13 on the framework side members 11. When frame 20 is at its forwardmost position switch 46 will stop the motor and brake unit 45 and the respective rollers 72 will fall freely over the front ends of the respective cam members 73. At this time, the weight of counterweight 30 will be overcome by the combined weight of arms 26 and the boards 62 carried thereby, permitting support arms 26 to lower themselves relative to frame 20 and framework 10. The forward movement of the frame 20 is limited by operation of cam 48 and switch 46.

While frame 20 remains stationary at its forward position (shown in dashed lines in FIGURE 1) boards 62 on support arms 26 will move downwardly, the support arms 26 being guided by rollers 39 which ride along the respective posts 25.

The initial layer of boards will be positioned on the upper surfaces of the channels 19 by means of a fixed abutment 75 which protrudes inwardly from the right hand channel 19 (FIGURES 3 and 9). When lever 49 contacts the abutment 75, the clockwise pivotal movement of lever 49 (FIGURE 9) will result in the rear end of lever 49 operating the switch 56 previously described. Switch 56 is connected to the motor control 51, and initiates rearward movement of frame 20. For successive layers of boards, the lever 49 will contact the upper surface of the previously positioned layer of boards in the manner shown in FIGURE 9. In either case, actuation of switch 56 will reverse the rotation of shaft 37 and draw frame 20 back rearwardly into the framework 10. As this occurs, the rearmost board 62 will be brought into contact with the front surfaces 13 of framework side members 11, which will result in the boards 62 being released from the support arms 26 in the manner shown in FIGURE 10. The boards 62 will thus be stacked in a neat vertical stack resting on the upper surfaces of channels 19 directly adjacent to and abutting the front surfaces 13. If desired, stickers can be placed longitudinally between the adjacent board layers. As seen in FIGURE 10, slight downward movement of arms 26 can occur after lever 49 has cleared the previously placed boards, but the counterweight 30 prevents undue pressure being exerted on the stack.

After arms 26 have cleared boards 62, they will begin upward movement due to the biasing effect of counterweight 30. They will return to the initial elevation shown in FIGURE 5. However, if they should return to this elevation too quickly, the lower surface 73 previously described will permit rollers 72 to properly move to their desired initial position immediately rearward of the rear cam surface 73a. After rollers 72 reach this initial position, switch 60 will again be operated by the left hand roller 72. Also, cam 50 will have operated switch 47 to stop motor and brake unit 45. During the time the boards 62 are being stacked by arms 26, additional incoming boards 62 can be positioned on the top surfaces 12 of framework 10, and the machine will begin a new cycle when both switch 58 and 60 are again properly actuated.

One advantage of this construction is that the apparatus brings the boards downwardly on a stack and operates as effectively in adding layers to an existing stack as in making a complete stack. The framework 10 can be mounted on a movable carriage, for instance a carriage movable transversely between several spaced locations at which stacks of boards are desired. The framework 10 can then receive boards from more than one source and stack the boards in more than one stack, leaving any stack when desired, whether the stack is partially completed, or fully completed. This can be of value in sorting different types of boards at a mill either as to quality or size.

As shown in the drawings, the surfaces 28 at the top of support arms 26 can be varied in length by providing replaceable plates 28a bolted to the arms 26 and removable to approximate the desired width of boards to be lifted thereby.

If the stacker is to be mobile, it is necessary that the surfaces on which the boards are to be stacked be independent of the frame 10. In such a case, it is necessary to reverse the supporting channels or members 21 so that they protrude rearwardly from posts 25 in frame 20, rather than forwardly as shown. It is then unnecessary to extend the ledges 63 forwardly beyond the front surface 13 of the framework 10. The framework 10 can then move transversely to the supports on which lumber is placed.

While two support arms 26 have been shown mounted within the framework 10, the arms could obviously be mounted externally on framework 10 or additional support arms could be provided for boards of greater length. These arms can be either inside or outside of the framework 10.

It also must be understood that the arms 26, in practice, will deflect under the load of the boards carried thereby, so that boards 62 will slide freely from the outer ends of the arms 26 as they are retracted into framework 10. The distance from which the boards 62 are dropped onto the existing stacked boards as illustrated in FIGURE 10 is exaggerated and does not take into account the normal deflection of the relatively thin arms 26.

While the surfaces 28 on arms 26 are the uppermost portions of the arms under the boards, it is possible, when handling boards of equal length, to provide upwardly and outwardly directed extensions on the outer arms to assist in aligning the ends of the boards even with one another as arms 26 come upwardly beneath the boards. These extensions would not be located under the boards lifted by arms 26, but would be used solely to position the board ends in the desired arrangement.

The details of the structure shown in the drawings is only examplary of the structures that might be used. Many modifications could be made without deviating from the basic concept of this invention and therefore only the following claims are intended to limit the scope of my invention.

Having thus described my invention, I claim:

1. A lumber stacking apparatus for successively positioning layers of boards to form a stack, said apparatus comprising:

(a) a framework having upright members that define the side of the stack;
(b) a forked lumber support means mounted on said framework for sequentially moving forward, down, back and up between the upright members;
(c) a power drive means operably connected to the lumber support means for selectively moving the lumber support means forward and back between the uprights;
(d) a gravity drive means operably connected to the lumber support means for permitting the downward movement of the lumber support means loaded with a layer and for raising the lumber support means when the layer is removed therefrom and
(e) control means responsive to the lowering of the lumber support means to a position immediately above the stack for activating the power means to move the lumber support means back between the upright members to strip the layer from the lumber support means and onto the stack.

2. The lumber stacking apparatus as defined in claim 1 wherein the framework has a support surface for receiving the boards thereon and wherein the apparatus further comprises a second control means responsive to the presence of a layer of boards on the support surface for activating the drive means to move the lumber support means forward.

3. The lumber stacking apparatus as defined in claim 2 further comprising an operating means for elevating the lumber support means above the framework support surface and into engagement with the forwardmost boards defining a layer and for removing the layer from the framework support surface as the lumber support means moves forward to separate the layer from the succeeding boards and to position the layer forward of the upright members.

4. The lumber stacking apparatus as defined in claim 3 further comprising a conveyor means mounted on the framework for moving the boards forward into abutting side-by-side relationship on the support surface of the framework.

5. The lumber stacking apparatus as defined in claim 4 further comprising stop means mounted on the framework for limiting the forward movement of the lumber on the support surface of the framework.

6. The lumber stacking apparatus as defined in claim 1 further comprising: a carriage reciprocally mounted on said framework for carrying the lumber support means forward and back and wherein the lumber support means is capable of movement up and down on the carriage and wherein the power drive means is connected to the carriage for moving the carriage forward and back and wherein the gravity drive means is connected to the lumber support means for raising and lowering the lumber support means.

7. The lumber stacking apparatus as defined in claim 1 wherein the gravity drive means includes a vertically movable counterweight connected to the forked lumber support means for biasing the lumber support means upwardly, said counterweight having an effective weight greater than the unloaded weight of the lumber support means but less than the weight of the lumber support means with a layer thereon.

8. The lumber stacking apparatus as defined in claim 1 wherein the control means includes a feeler device (49) carried by the lumber support means that senses the height of the stack to activate the power drive means to pull the lumber support means back between the upright members as the layer approaches the stack to strip the layer from the lumber support means and into the stack.

9. The lumber stacking apparatus as defined in claim 3 wherein the operating means includes a cam track affixed to the framework for receiving a cam roller mounted on the lumber support means to elevate the lumber support means into engagement with the forwardmost boards on the framework support surface to separate the forwardmost boards from the succeeding boards as the lumber support means moves forward.

10. A lumber stacker for receiving incoming transversely fed boards for successively positioning layers of the boards in front of the stacker on a stack, said stacker comprising:
  (a) a framework having a support surface for receiving the incoming transversely fed boards and front uprights forming stripping members;
  (b) a carriage mounted to said framework for reciprocating movement;
  (c) a lumber support means movably mounted on said frame for up and down movement from an initial position immediately below the frame top surface;
  (d) a drive means connected to the carriage for moving the carriage to and from a rearward position with the lumber support means behind the framework uprights and a forward position with the lumber support means forward of the uprights;
  (e) a cam track affixed to the framework having an inclined rear surface for receiving a cam roller that is connected to the lumber support means to move the lumber support means upward from the initial position and into engagement with a layer of boards as the frame is moved forward;
  (f) a counterweight drive means connected to the lumber support means and rendered effective when the lumber support means is forward of the uprights for permitting a loaded lumber support means to move downwardly and for raising the lumber support means to the initial position when the boards are stripped therefrom;
  (g) a first control means responsive to the presence of a layer of boards on the framework support surface for activating the carriage drive to move the frame forward; and
  (h) a second control means responsive to the position of the top of the stack for activating the carriage drive means to move the frame rearward to strip the lowered layer from the lumber support means when the lumber support means is immediately above the top of the stack.

References Cited

UNITED STATES PATENTS

| | | | |
|---|---|---|---|
| 831,217 | 9/1906 | Eisenmayer | 214—127 X |
| 1,556,695 | 10/1925 | Kronberg | 214—6 |
| 2,234,991 | 3/1941 | Todhunter | 214—6 |
| 2,730,247 | 1/1956 | Lawson | 214—6 |
| 2,915,202 | 12/1959 | Aitken | 214—6 |
| 3,130,839 | 4/1964 | Grasvoll | 214—6 |
| 3,169,646 | 2/1965 | Mason | 214—6 |

FOREIGN PATENTS

| | | |
|---|---|---|
| 1,286,465 | 1/1962 | France. |
| 892,428 | 10/1953 | Germany. |
| 1,108,145 | 5/1961 | Germany. |

GERALD M. FORLENZA, *Primary Examiner.*

R. J. SPAR, *Assistant Examiner.*

U.S. Cl. X.R.

214—99